United States Patent
Isip, Jr. et al.

(10) Patent No.: US 6,427,143 B1
(45) Date of Patent: Jul. 30, 2002

(54) METHOD FOR LOADING ROWS INTO A DATABASE TABLE WHILE ENFORCING CONSTRAINTS

(75) Inventors: Amando B. Isip, Jr., Richardson, TX (US); Stephen J. Weaver, Lisle, IL (US); Liza N. Ramos, Chicago, IL (US); Steve Donovan, Glen Ellyn, IL (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/058,754

(22) Filed: Apr. 10, 1998

(51) Int. Cl.[7] .............................................. G06F 17/30
(52) U.S. Cl. .......................................... 707/1; 707/102
(58) Field of Search ................................ 707/1, 2, 4, 5, 707/9, 100, 101, 102, 104, 7, 10, 201, 200, 203, 202; 395/702

(56) References Cited

U.S. PATENT DOCUMENTS

| | | | | |
|---|---|---|---|---|
| 4,933,848 A | * | 6/1990 | Haderle et al. ............. | 707/201 |
| 5,226,158 A | * | 7/1993 | Horn et al. .................. | 707/201 |
| 5,386,557 A | * | 1/1995 | Boykin et al. ............... | 707/1 |
| 5,513,350 A | * | 4/1996 | Griffin et al. ............... | 395/702 |
| 5,579,515 A | * | 11/1996 | Hintz et al. ................. | 707/7 |
| 5,706,494 A | * | 1/1998 | Cochrane et al. ............ | 707/2 |
| 5,745,896 A | * | 4/1998 | Vijaykumar ................. | 707/100 |
| 5,899,993 A | * | 5/1999 | Jenkins, Jr. .................. | 707/9 |
| 6,151,608 A | * | 11/2000 | Abrams ....................... | 707/204 |

* cited by examiner

Primary Examiner—Sanjiu Shah
(74) Attorney, Agent, or Firm—Baker & McKenzie

(57) ABSTRACT

Data to be loaded into a table of a database is read from an input file by a LOAD utility including a CHECK subutility that performs constraint checking on each row prior to loading the row into the table. During initialization of the CHECK subutility, the DB2 catalog is read to identify any constraints that apply to the data to be loaded. If any check constraints apply, check constraint routines are built and compiled by the CHECK subutility. If any referential integrity constraints apply, the key values for the parent index of each referential integrity constraint are read and stored in an additional dataspace allocated by the CHECK subutility so that the foreign key values from each row to be loaded can be located by the CHECK subutility and compared against the parent index values prior to loading the data into the table. When the constraint checking for the loading of data is complete, the additional dataspace allocated by the CHECK subutility is released.

21 Claims, 8 Drawing Sheets

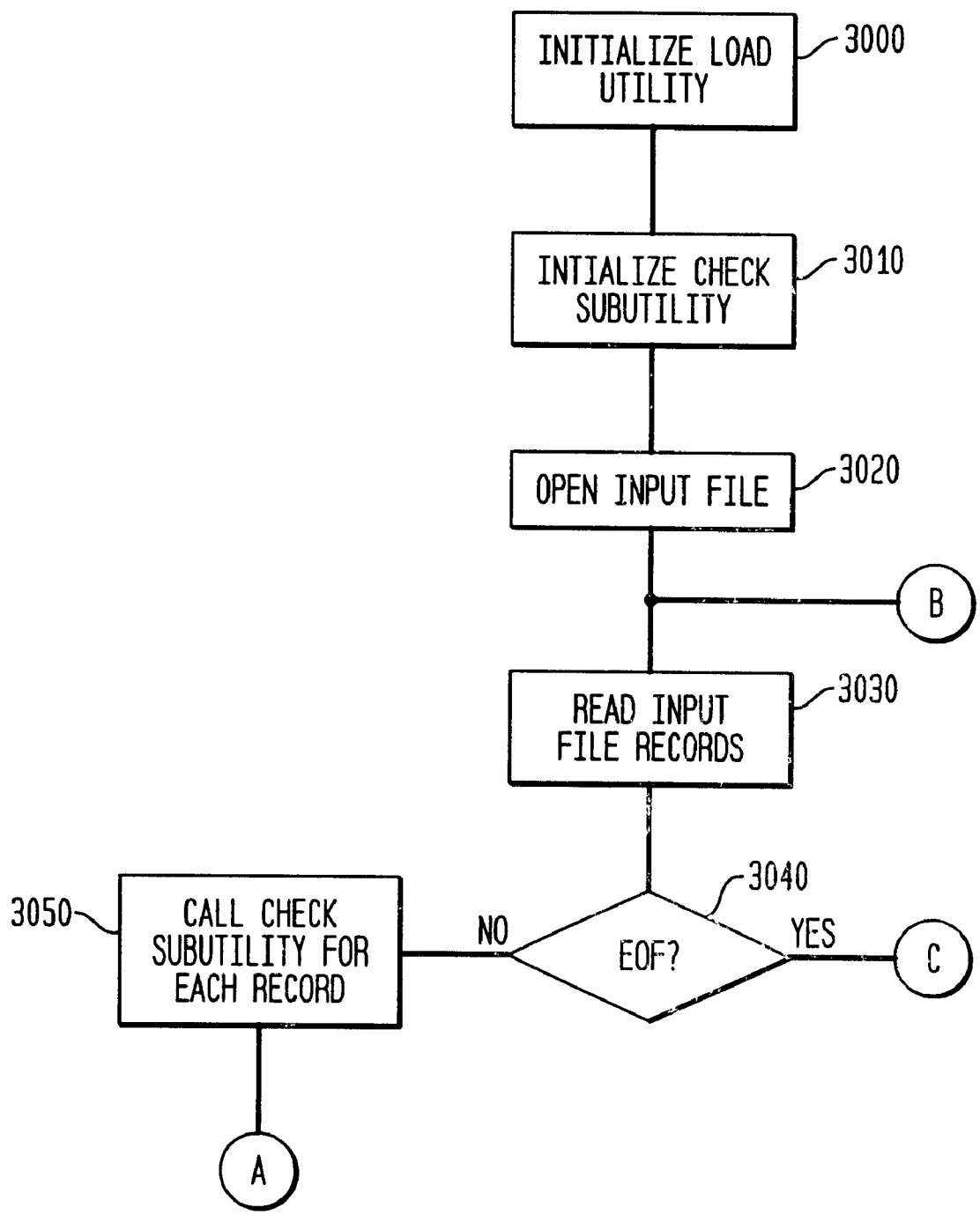

METHOD FOR LOADING ROWS INTO A DATABASE TABLE WHILE ENFORCING CONSTRAINTS

FIELD OF THE INVENTION

The present invention relates to database management systems, and particularly to a method for loading rows into a database table while enforcing constraints.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. For exemplary purposes, illustrated below is an order_entry table that would be stored in a tablespace. The order_entry table contains columns: customer_number; product_code; order_number; buyer_name; and ship_to_zip.

| customer_number | product_code | order_number | buyer_name | ship_to_zip |
|---|---|---|---|---|
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above order_entry table shows four rows, the table could have millions of rows for all the orders of a company, for example 4 million rows. The order_entry table also has, for example, three index keys and two foreign keys. An index key is an identifier for a particular row of a table while a foreign key also identifies a row but is also used for referential integrity as described below. For example, in the order_entry table, one index key could be based on order_number, another index key based on buyer_name and a third index key based on ship_to_zip. As is known in the art, an index key for a particular table indicates a row identification (RID) and a selected value for the row (e.g., the index key value). The index key can be used to generate an index for the table which facilitates subsequent searches for particular data in the table. For example, the order_entry table would have three indexes (e.g., one for each index key), each index being stored in an indexspace. Similar to a tablespace, an indexspace is, for example, a designated portion of a DASD. Thus, if a user was looking for rows that contain a particular buyer name in the order_entry table, the database management system could query the buyer index for the table to identify all occurrences of the buyer name without reading the entire table to locate the rows.

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order_entry table) but each foreign key must be associated with a unique key in a parent table of the child table.

Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has for example, a RI constraint on customer_number and product_code. As is known in the art, when a user of a DB2 database management system creates a table, the user also defines the constraints for the table (e.g., the user can define the relational integrity criteria). Illustrated below is a product table and a customer table (e.g., the parent tables for the foreign keys in the order_entry table).

| product_code | product_description | retail_price |
|---|---|---|
| 00010 | laptop pc | 1000.00 |
| 00020 | desktop pc | 1100.00 |
| 00030 | office pc | 1200.00 |
| 00040 | lan pc | 3500.00 |
| 00050 | home pc | 999.99 |

The product table show five rows, although the table could have thousands of rows for all of the different products of a company. The product table has a unique index on the column product_code, which is illustrated in ascending order. The values in the column product_code are each unique since there is only one product code assigned to each product and thus in this table, a product code would not be included more than once. Accordingly, an index for the product table would include the key (e.g., the stored value in the product_code column) and a RID. The product table index would reside in a DB2 indexspace.

The customer table illustrated below shows four rows, although this table could also have thousands of rows for all of the customers of a company. The customer table has a unique index on the column customer_number, illustrated in ascending order. The values in the column customer_number are each unique since there is only one customer number assigned to each customer name and thus a customer number would not be included in this table more than once. Accordingly, an index for the customer table would include the key (e.g., the value of the column customer_number) and a RID. The customer index would also reside in a DB2 indexspace.

| customer_number | buyer_name | customer_address |
|---|---|---|
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the order_entry table are valid because the foreign key values in the column product_code exist in the index of the product table and the values in the column customer_number exist in the index of the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value being in the range of 00000 to 99999.

When a user needs to, for example, populate the order_entry table with data, there are two options. One option is that a DB2 application program can be written by the user to load the data. For example, for many operations to be performed on a table of a DB2 database, such as loading data, an application program can be written (e.g., coded in software) to make use of DB2-provided services via, for example, structured query language (SQL) INSERT statements. Such applications, however, present an additional burden on users of the database system as the applications have to be written for the desired function to be performed.

An application program that is inserting, for example, 4 million records into a table will cause the DB2 system to perform around 4 million input/output (I/O) operations to enforce any required referential integrity constraints, which is in addition to the 4 million I/Os required to load the data into the table initially. Therefore, as each I/O takes approximately 25 ms, a significant amount of time can be spent loading a large number of records using an application program. In tuning performance of any computer program, including an application program, the variables involved in achieving optimal performance include instruction path length (e.g., the number of instructions), memory (e.g., address space) and number of I/Os. Therefore, a reduction in the number of I/Os to be performed can be accomplished, for example, by increasing the amount of memory utilized by the program.

An alternative to application programs for loading data is a load utility, which is generally faster than an application program. For example, a load utility will enforce any referential integrity constraints (in contrast to the application program requiring the DB2 system enforce constraints), thus providing a faster load of data. While constraints help ensure that the data in a database is consistent and clean, constraint enforcement normally requires an I/O to each parent index for each row. This is especially a problem when attempting to load a large number of rows into a database. The most common way of dealing with this problem has been to load the rows without checking the constraints and, after all of the rows are loaded, going back and checking the constraints and deleting the rows which violate the constraints. For example, conventional LOAD utilities for loading large amounts of records into a relational database conventional database management systems do not perform any referential integrity constraint checking prior to loading the new records into a table.

FIG. 1 illustrates a prior art method for loading new records into a database and performing referential integrity (RI) checks, but as described below, the RI checks are performed after the new data has been loaded into the database. As shown in FIG. 1, in step 1000, data to be loaded into a table of a database is provided in an input file and a conventional LOAD utility, such as LOAD utilities provided by IBM Corporation, reads the input file and if an end of file (EOF) identifier is not read in step 1010, each record in the input file is written into the tablespace in step 1020. After each row is loaded into the table in step 1020, then in step 1030 the SORT input records are built for 10 the index keys and foreign keys and written to a temporary input file for the SORT utility and are temporarily stored in step 1040. When the index keys and foreign keys are extracted and the SORT input records are built, the LOAD utility provides, for example, an identifier with each input record that can be subsequently read by the LOAD utility to identify what the particular SORT record represents. Step 1030 loops back to step 1000 to read additional records of the input file. When an EOF indicator is read in step 1010, step 1050 reads the input file of extracted index and foreign keys from step 1040 and sorts the index and foreign keys into, for example, ascending or descending order via a conventional SORT utility. As is apparent, when step 1010 identifies an EOF condition, the table has been loaded with the data from the input file but no referential integrity constraints have been applied to the loaded data.

The SORT utility in step 1050 collates the key values for each of the indexes and foreign keys in a conventional manner and writes the sorted values to a temporary sort output file where 30 the values are temporarily stored in step 1060. Once the SORT process is complete, the index key values stored in step 1060 are read and are written to the appropriate indexspace in step 1080 (e.g., using the order_entry table example, the indexes for order_number, buyer_name and ship_to_zip would be written to the appropriate indexspace DASD in step 1080). In step 1090, the foreign key values stored in step 1060 are read and compared against the appropriate parent index. As is known in the art, when the foreign key values are passed to the SORT utility in step 1050, the identifier provided when the key was extracted is also provided that identifies the parent index to be used in the enforce constraint phase of the LOAD operation.

If a match is determined between the foreign key value and the parent index in step 1100, the loaded data is valid and the load process is completed for the particular row in step 1110.

If, however, there is no match between the foreign key value and the parent index in step 1100, then in step 1120, the row is deleted from the table and also from the corresponding entries in the indexes for the table. The process of deleting the row from the table includes, for example, reading the page in the tablespace that contains the invalid row, flagging the invalid row as deleted and rewriting the page into the tablespace. Similar action must be taken for deleting each invalid row in each index of the table.

Thus, the prior art approach to loading large amounts of data into a database includes a program that first loads all of the data into the table, reads each row of the loaded table, extracts the index keys and foreign keys involved in the referential integrity constraint check, sorts the extracted key values, writes the indexes for the table, reads the sorted foreign keys and compares them against the parent index and then deletes any invalid rows from the table as well as the indexes.

SUMMARY OF THE INVENTION

According to the present invention, data to be loaded into a table of a database is read from an input file by a LOAD utility including a CHECK subutility that performs constraint checking on each row prior to loading the row into the table. For example, each row from an input file is read by the LOAD utility and passed to the CHECK subutility which applies any applicable constraints against the row and provides a code to the LOAD utility indicating whether the row should be loaded or discarded. If the row is to be loaded, the LOAD utility writes the row into the tablespace and passes the index keys to a SORT utility so that the indexes for the loaded table can be written into indexspace.

For example, during initialization, the CHECK subutility according to the present invention can, for example, read the DB2 catalog to identify any constraints that apply to the data to be loaded. If any check constraints apply, check constraint routines can be built and compiled for evaluation by the CHECK subutility. If any referential integrity constraints apply, the key values for the parent index of each referential integrity constraint can be read and the key values stored in an additional dataspace allocated by the CHECK subutility so that the foreign key values from each row to be loaded can be extracted by the CHECK subutility and compared against the parent index values prior to loading the data into the table. When the constraint checking for the loading of new data is completed, the dataspace allocated by the LOAD utility to facilitate pre-load constraint checking is released.

Thus, the method for loading data into a database table according to an embodiment of the present invention eliminates writing unchecked and potentially invalid rows into a table, sorting and writing index keys of unchecked and potentially invalid rows, sorting of foreign keys, the need to delete invalid rows from a loaded table and the need to delete invalid rows from indexes.

BRIEF DESCRIPTION OF THE DRAWINGS

FIGS. 3A and 3B illustrate an exemplary method for loading data into a database while enforcing referential integrity constraints according to an embodiment of the present invention.

DETAILED DESCRIPTION OF THE INVENTION

Figure 2:
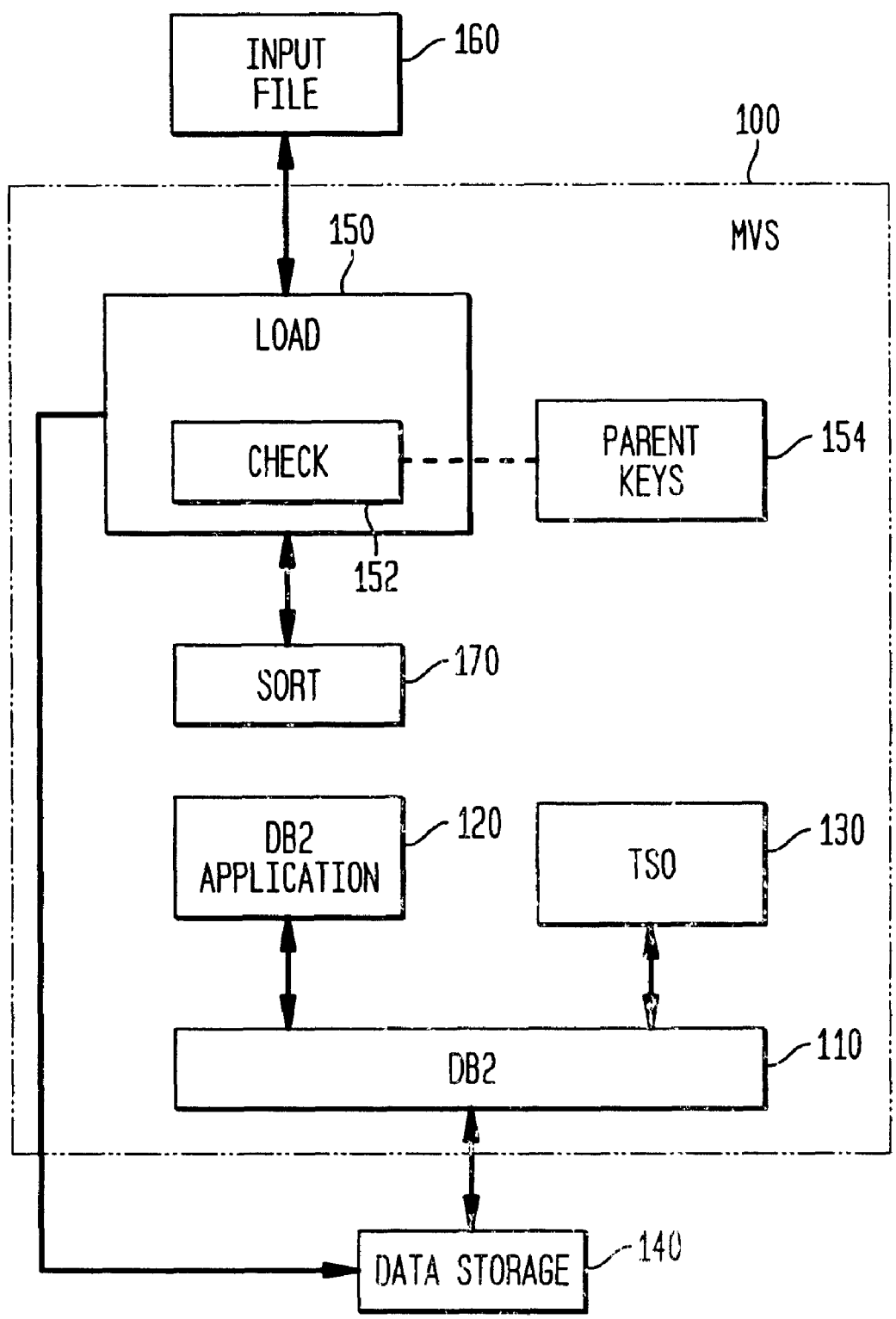
FIG. 2 illustrates an exemplary database system according to an embodiment of the present invention.

FIG. 2 illustrates, in greatly simplified form, a typical configuration in which DB2 is used. As shown in FIG. 2, the configuration includes a computer system 100 operating under, for example, the IBM MVS operating system software. The computer system 100 includes a DB2 database manager 110 which interacts with a direct access storage device (DASD) 140. An IBM Time Sharing Option (TSO) software function 130 is also included in computer system 100 which also interacts with the DB2 database manager 110 to, for example, read from and write to DASD 140. A conventional SORT utility 170 is also included in computer system 100, SORT utility 170 interacting with LOAD utility 150 to, for example, sort index keys so that they can be written into DASD 140 to form the indexes for the table. In order to enforce constraints while loading a DB2 table according to an embodiment of the present invention, a LOAD utility 150, for example a software program stored in memory of the computer system 100 (the memory also being referred to as address space), includes and interfaces with a CHECK subutility program 152 as illustrated in FIG. 2 and described in detail with regard to FIGS. 3A to 5B. FIG. 2 also shows an input file 160 of data to be loaded into a table, the input file 160 being coupled to the LOAD utility 150.

Figure 3B:
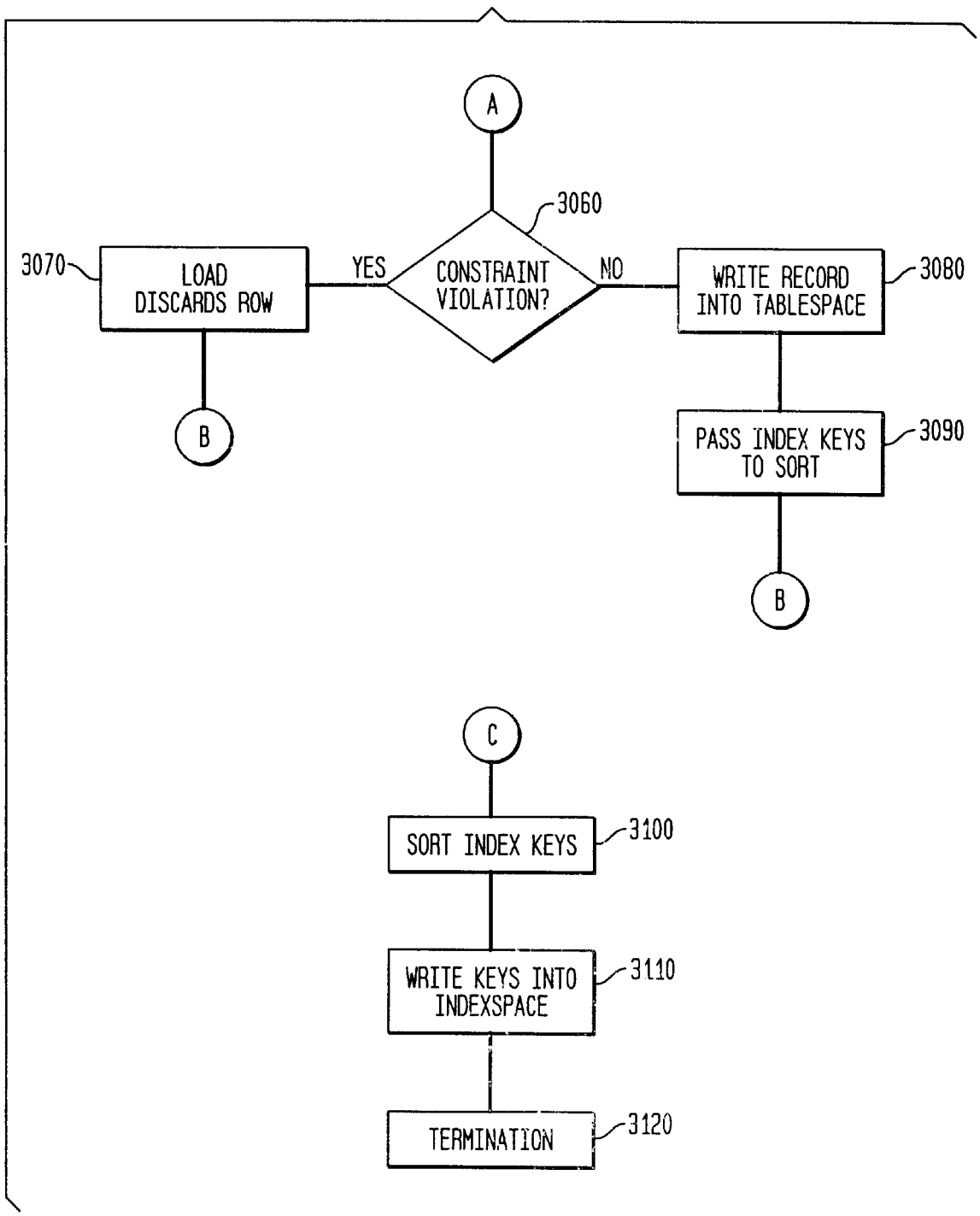

An exemplary method for loading rows into a database according to an embodiment of the present invention is illustrated in FIGS. 3A and 3B. The method of the present invention is provided, for example, as a utility separate from the DB2 applications 120 and is identified as LOAD utility 150 in FIG. 2. As shown in FIG. 3A, in step 3000, LOAD utility 150 is initialized, for example by a user of the database management system when data is to be loaded into a table. For example, the user could provide the name of the DB2 table to be loaded as well as the name of the input file 160, which is in the form of a flat file, to initialize the LOAD utility 150. In step 3010, the LOAD utility 150 initializes the CHECK subutility 152. The LOAD utility 150 then opens the input file 160 in step 3020 and read a record of the input file 160 in step 3030. The input file 160 includes, for example, a sequential input file having many records to be loaded into the table, each record including various fields, the fields containing the values to be loaded. When the user invokes the LOAD utility 150, the user may also provide control statements that specify which fields of the records in the input file 160 are to be loaded into particular columns of the table so that the LOAD utility 150 can properly load the table.

For each record of the input file read by the LOAD utility 150, a check is made in step 3040 to determine if an end of file (EOF) condition has been reached. If an EOF condition is determined in step 3040, the LOAD utility according to an embodiment of the present invention proceeds to point C in FIG. 3B, described below. If an EOF condition is not reached in step 3040, however, then the LOAD utility 150 calls the CHECK subutility 152 in step 3050. The CHECK subutility 152 determines if there are any constraint violations in step 3060, illustrated in FIG. 3B and described in more detail with regard to FIGS. 4A, 4B and 5. If the CHECK subutility 152 determines that there is a constraint violation in step 3060, then in step 3070 the LOAD utility 150 discards the row and the row is not loaded into the table. If the CHECK subutility 152 determines in step 3060 that there is no constraint violation, then in step 3080 the LOAD utility 150 writes the row into the table (e.g., into the tablespace of DASD 140 allocated for storage of the table). In step 3090, the LOAD utility 150 extracts the index keys from the row to be loaded and passes the index keys to the SORT utility 170.

After a particular record from input file 160 is processed in accordance with the present invention through step 3090, the method loops back to point B on FIG. 3A to read the next record in the input file 160, this loop continuing until an EOF condition is reached in step 3040.

Figure 4A:
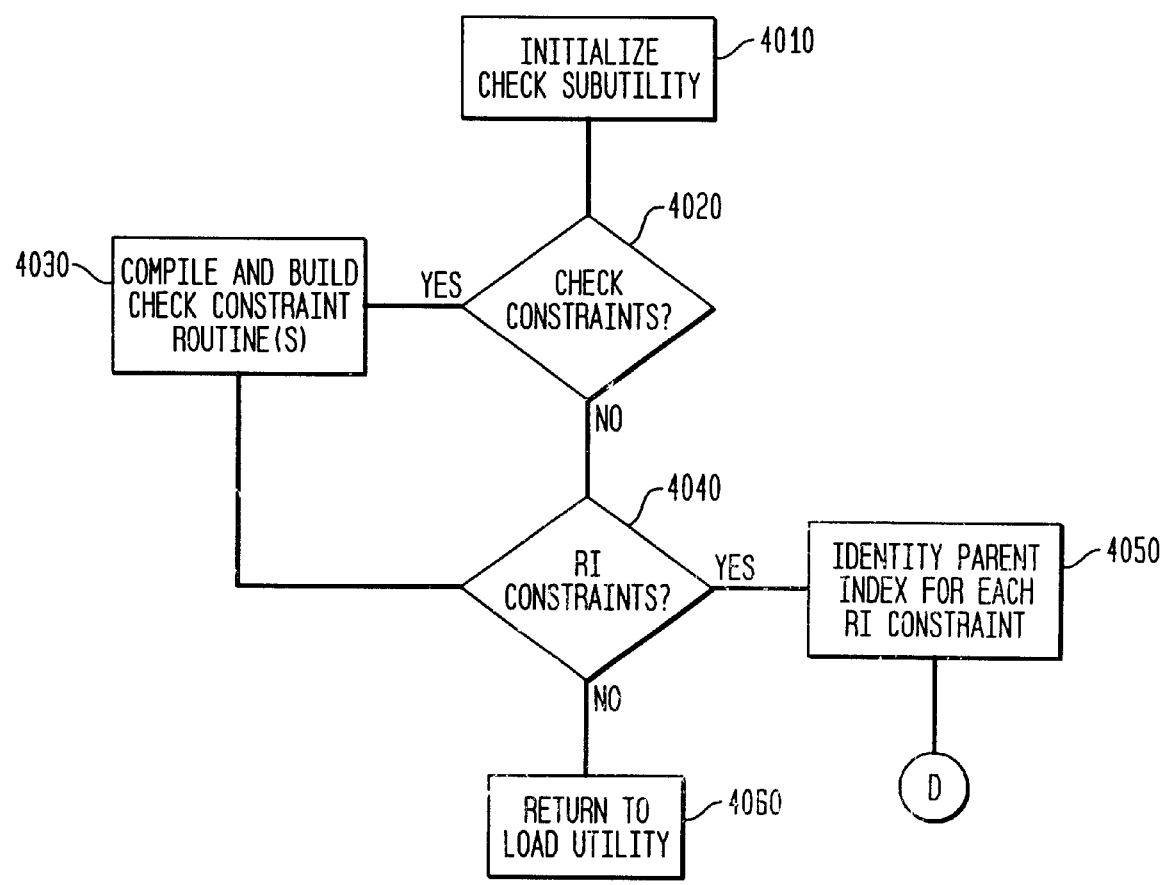
FIGS. 4A and 4B illustrate an exemplary method for initialization of a CHECK subutility according to an embodiment of the present invention.
Figure 4B:
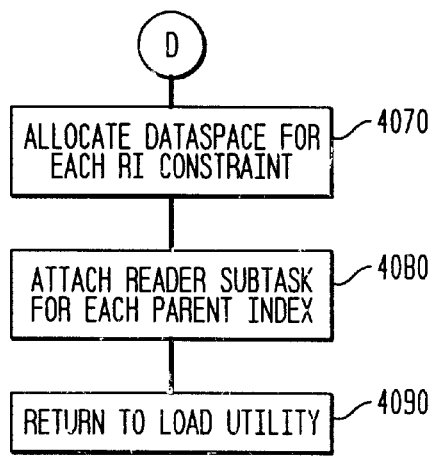

Once all of the records of the input file 160 have been processed by the CHECK subutility 152 according to an embodiment of the present invention and the index keys for each loaded row have been passed to the SORT utility 170 in step 3090, the SORT utility 170 sorts the index keys in step 3100 to arrange the index keys in, for example, ascending or descending order. In step 3110, the index keys are written into the appropriate indexspace in DASD 140, thereby creating the indexes for the loaded table. In step 3120, the LOAD utility 150 terminates. FIGS. 4A and 4B illustrate initialization of a CHECK subutility 152 according to an embodiment of the present invention referred to in step 3010 of FIG. 3A. In step 4010, the CHECK subutility 152 is initialized, for example by the LOAD utility 150. In step 4020, it is determined if any check constraints apply to the data to be loaded. Applicable check constraints can be identified, for example, by the CHECK subutility 152 reading the DB2 catalog (e.g., the SYSIBM.SYSCHECKS table in the catalog) to identify any check constraints that apply to the table to be loaded. The check constraints that apply, if any, are defined when the table to be loaded is originally created in the database system and are stored in the DB2 catalog, which can be subsequently queried for the information. For example, the following is an example of how to read the SYSCHECKS table in the DB2 catalog:

SELECT CHECKNAME, CHECKCONDITION
   FROM SYSIBM.SYSCHECKS
      WHERE CREATOR=:#CCR_CREATOR,
         AND TBNAME=:#CCR_TBNAME.

If no check constraints are defined for the table to be loaded, then, for example, DB2 returns a SQL code of =+100.

If a check constraint is defined for the table to be loaded, however, then the DB2 catalog returns a row value identifying the check constraint. The row value is the check predicate and in step 4030, check constraint routines are compiled and built, as is known in the art, by the CHECK subutility 152. For example, the check predicate(s) returned from the DB2 catalog are compiled and a check constraint routine is built.

If no check constraints apply in step 4020 or after any applicable check constraint routines are built in step 4030, in step 4040 it is determined if any referential integrity constraints apply. Applicable referential integrity constraints can be identified by, for example, the CHECK subutility 152 reading the DB2 catalog (e.g., the SYSIBM.SYSRELS table of the catalog) for the table to be loaded (e.g., for the order_entry table in the example). The relational integrity constraints that apply, if any, are defined when the table to be loaded is originally created in the database system and are stored in the DB2 catalog, which can be subsequently queried for the information as described above. For example, the following is examplary code for how to read the SYSRELS table of the DB2 catalog.

SELECT REFTBNAME,
   REFTBCREATOR,
   RELNAME,
   IXOWNER,
   IXNAME,
FROM SYSIBM.SYSRELS
   WHERE CREATOR=:#RELS_CHILD_CREATOR,
      AND TBNAME=:#RELS_CHILD_TBNAME;

If no referential integrity constraints are defined for the table to be loaded, then an SQL code of +100 is returned by DB2. The CHECK subutility 152 then returns to the LOAD utility 150 in step 4060. If any referential integrity constraints are defined for the table to be loaded, however, then the DB2 catalog returns the row value for each referential integrity constraint parent table (e.g., the DB2 catalog provides the row of the SYSIBM.SYSRELS table having a column with the name of the parent table for the referential integrity constraint). More than one row can be returned by the DB2 catalog if more than one referential integrity constraint is defined for the table to be loaded. Using the order_entry table example, as two referential integrity constraints are defined for the table, the DB2 catalog would return the rows for the two parent tables (e.g., the customer table and the product table). The CHECK subutility 152 then reads the DB2 catalog to identify the column names for the foreign keys, for example by reading the SYSFOREIGNKEYS table in the DB2 catalog. Exemplary code for how to read the SYSFOREIGNKEYS table is set forth below.

SELECT
   CREATOR,
   TBNAME,
   RELNAME,
   COLNAME,
   COLSEQ

FROM SYSIBM.SYSFOREIGNKEYS
   ORDER BY 1, 2, 3, 5;

If it is determined, however, that referential integrity constraints apply to the data to be loaded in step 4040, then in step 4050, the parent index for each applicable referential integrity constraint is identified by the CHECK subutility 152. For example, the CHECK subutility 152 can read the DB2 catalog (e.g., the SYSIBM.SYSINDEX table of the DB2 catalog) for each parent table identified in step 4040 and the DB2 catalog will return the name of the parent index for the parent table. For example, the following is exemplary code for reading the SYSINDEX table of the DB2 catalog.

SELECT
   INDEXSPACE,
   UNIQUERULE
FROM SYSIBM.SYSINDEXES
   WHERE TBNAME=#RELS_CHILD_TBNAME,
      AND TBCREATOR=#RELS_CHILD_CREATOR;

The CHECK subutility 152 also determines the size of each parent index. A method for determining the size of the parent index includes, for example, using MEDIA MANAGER or VSAM MVS services to identify the highest used relative byte address (RBA).

In step 4070, illustrated in FIG. 4B, the CHECK subutility 152 allocates dataspace (e.g., memory) in the computer system 100, identified as dataspace 154 in FIG. 2, to temporarily store the parent key values for each parent index identified in step 4050. The size of the allocated dataspace is determined, for example, as a function of the RBA. The allocation of dataspace 154 can be done, for example, by utilizing the service of the IBM MVS operating system to provide the dataspace (e.g., virtual storage) needed for storing the index entries. For example, by using the IBM MVS service, dataspace can be allocated outside of the address space needed by the LOAD utility 150 and thus does not impede the execution of the LOAD utility 100. The additionally allocated dataspace supplements the memory available to the LOAD and CHECK utilities so that, for example, constraint enforcement can be performed prior to loading data into a table in accordance with an exemplary embodiment of the present invention.

Exemplary macro instructions for allocating dataspace 154 is shown below.

| | | |
|---|---|---|
| DSPSERV CREATE | | X |
| NAME=#RELS_DSNAME, | a unique name for MVS use | X |
| STOKEN=#RELS_DSTOKEN, | token for ALESERV macro use | X |
| BLOCKS=#RELS_DSSIZE, | count of 4k pages in parent index | X |
| ORIGIN=#RELS_DSORG | address of 1st byte of dataspace | |
| ALESERV ADD, | | X |
| STOKEN=#RELS_DSTOKEN, | from DSPSERV | X |
| ALET=#RELS ALET, | dataspace id | X |
| AL=PASN | | |

In step 4080, a reader subtask is attached to each parent index. The reader subtasks, as is known in the art, will start reading the indexspace for each parent index identified in step 4050 and will then store the parent key values into the dataspace 154 allocated for each parent index. The reader subtasks, as is known in the art, can run concurrently with other tasks of the LOAD utility 150, such as a SORT subtask. It should be understood that more than one dataspace 154 can be allocated by step 4080 so that there is a dataspace 154 for each parent index (corresponding to each referential integrity constraint defined for the table to be loaded and thus to be applied to the input file 160). Once a reader subtask has been been attached to each parent index, the CHECK subutility 152 returns to the LOAD utility 150 in step 4090.

An example of the assembler instructions for how the parent key values are stored in dataspace 154 is provided below (e.g., the subtasks will start reading the indexspace).

|  |  |  |
|---|---|---|
| LA | R14,IXKEYVAL | POINT TO KEYVALUE |
| LR | R3,R2 | KEYLENGTH |
| LR | R15,R2 | MVCL LENGTH |
| L | R2,#RELS_COUNT | |
| LA | R2,1(R2) | OFFSET OF ZERO SLOT IS UNUSED |
| ST | R2,#RELS_COUNT | |
| MH | R2,#RELS_KEYLEN | |
| A | R2,#RELS_DSORG | |
| SYSSTATE ASCENV=AR | | SET GLOBAL BIT FOR AR MODE |
| LAM | R0,R15,=16F'0' | CLEAR EM |
| LAM | 2,2,#RELS_ALET | LOAD ALET OF SPACE INTO AR2 |
| SAC | 512 | SWITCH TO AR MODE |
| * | | |
| MVCL | R2,R14 | COPY INTO DATASPACE |
| SAC | 0 | SWITCH TO PRIMARY |
| SYSSTATE ASCENV=P | | DITTO |
| - Return to caller | | |

Figure 5:
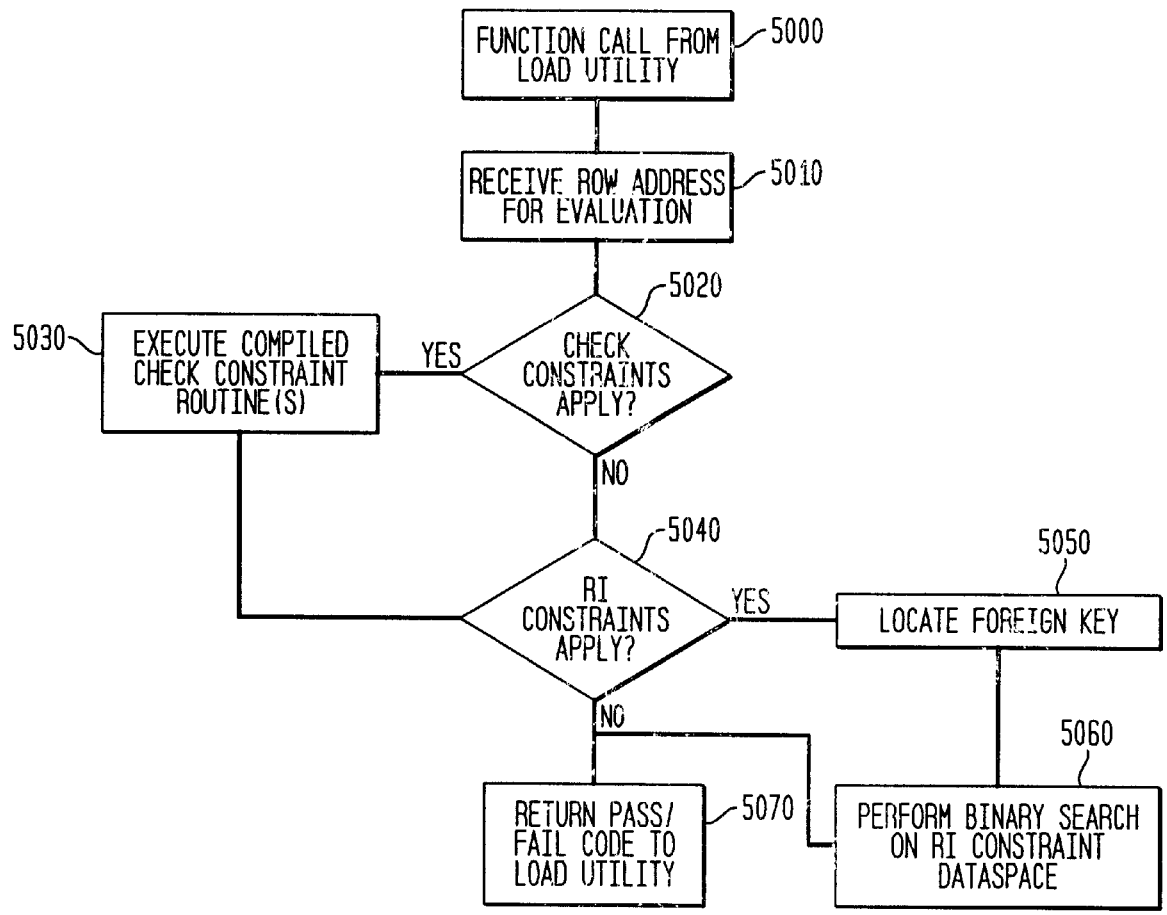
FIG. 5 illustrates an exemplary method for execution of a CHECK subutility according to an embodiment of the present invention.

FIG. 5 illustrates an exemplary operation of a CHECK subutility 152 according to an embodiment of the present invention. In step 5000, a function call is made to CHECK subutility 152 from LOAD utility 150, for example when the LOAD utility has read a row from an input file 160. In step 5010, an address of a row from the input file 160 is received by the CHECK subutility 152. In step 5020, it is determined whether any check constraints apply (e.g., whether any check constraint routine has been created for the table to be loaded during the initialization phase of the CHECK subutility 152). If any check constraints exist, then the compiled check contraint routine(s) are executed in step 5030 and then it is determined in step 5040 if any referential integrity constraints apply. Similarly, if no check constraint exists, then it is determined in step 5040 whether any referential integrity checks apply (e.g., were any referential integrity constraints identified during the initialization phase of the CHECK subutility 152).

If it is determined in step 5040 that no referential integrity checks apply, then, for example, a PASS code is passed from the CHECK subutility 152 to the LOAD utility 150 indicating to the LOAD utility 150 that the row should be loaded into the table. However, if it is determined in step 5040 that referential integrity constraints do apply, then the foreign key is located using the row address in step 5050. For example, during creation of the table to be loaded, any referential integrity constraints are defined and stored in the DB2 catalog which can subsequently be read by the CHECK subutility 152, as described during the CHECK subutility 152 initialization phase. Thus, the column name for the foreign key is known (e.g., it is the same as the column name of the referential integrity constraint) and can be used by the CHECK subutility 152 to locate the foreign key in the row pointed to by the row address passed to the CHECK subutility in step 5010.

In step 5060, a binary search (e.g., a compare operation) is performed between the located foreign key and the parent index dataspace 154 (which stores the parent keys for the referential constraints). If more than one referential integrity constraint is defined for the table, then the CHECK subutility 152 would select the appropriate parent index dataspace 154 to perform the binary search. An example of assembler instructions for a binary search are set forth below.

```
* DO A BINARY SEARCH ON THE FOREIGN KEY                                *
*======================================================================*
BINARY_SEARCH   @SUBIN
         LAM    0,15,=16F'0'              CLEAR EM
         LAM    2,2,#RELS_ALET            LOAD ALET OF SPACE INTO AR2
         SAC    512                       SWITCH TO AR MODE
         SYSSTATE ASCENV=AR               SET GLOBAL BIT FOR AR MODE
         LM     R4,R5,#RELS_BIN_START     R4 = START SLOT NO, R5 = HALF
         LH     R3,KEYLENGTH              KEYLENGTH
         BCTR   R3,0
CHECK    DS     0H
         LR     R2,R4                     SLOT NUMBER
         MH     R2,#RELS_KEYLEN           OFFSET OF 1
         A      R2,#RELS_DSORG            START OF DATASPACE
         EX     R3,COMPARE                CLC   0(0,R2),KEYVALUE
         BL     PIPE_LOWER
         BH     PIPE_HIGHER
         B      SEARCH END
PIPE_LOWER DS   0H
         IF     (LTR,R5,R5,Z)
                MVC    #FCM_RETURN_CODE,=F'4' NOT FOUND
                OI     #FCM_REASON_CODE+3,X'02'
                B      SEARCH_END
         ENDIF
         LR     R14,R4                    SAVE ORIGINAL SLOT
         AR     R14,R5
         SRL    R5,1                      DIVIDE BY 2
         IF     (C,R14,GT,#RELS_COUNT)
                B      PIPE_LOWER
         ENDIF
         LR     R4,R14                    NEW SLOT
         B      CHECK
```

```
                                -continued

PIPE_HIGHER DS   0H
            IF      (LTR,R5,R5,Z)
                    MVC     #FCM_RETURN_CODE,=F'4' NOT FOUND
                    OI      #FCM_REASON_CODE+3,X'02'
                    B       SEARCH_END
            ENDIF
            SR      R4,R5
            SRL     R5,1                        DIVIDE BY 2
            B       CHECK
SEARCH_END  SAC 0                               SWITCH TO PRIMARY
            SYSSTATE ASCENV=P                   TELL ASSEMBLER
            LAM     2,2,=F'0'                   CLEAR IT
            @SUBOUT RESTORE=YES
COMPARE     CLC     0(0,R2),FOREIGN_KEY
```

If a match exists in the binary search performed in step 5060, then, for example, a PASS code is passed from the CHECK subutility 152 to the LOAD utility 150 indicating to the LOAD utility 150 that the row should be loaded into the table. If no match exists in the binary search performed in step 5060, then, for example, a FAIL code is passed from the CHECK subutility 152 to the LOAD utility 150 indicating to the LOAD utility 150 that the row should be discarded and thus not be loaded into the table.

Figure 6:
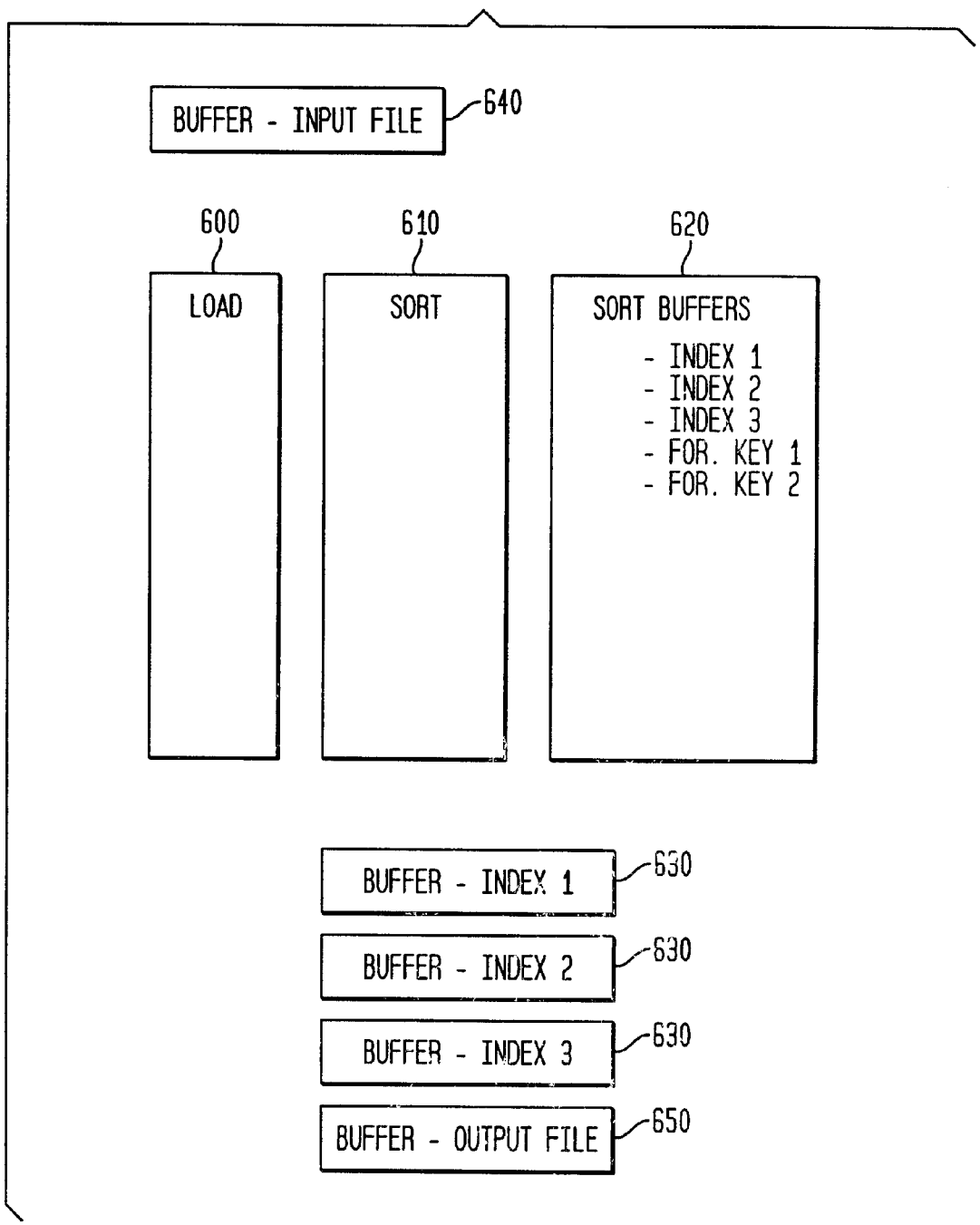
FIG. 6 illustrates a prior art allocation of address space for a conventional LOAD utility.
Figure 7:
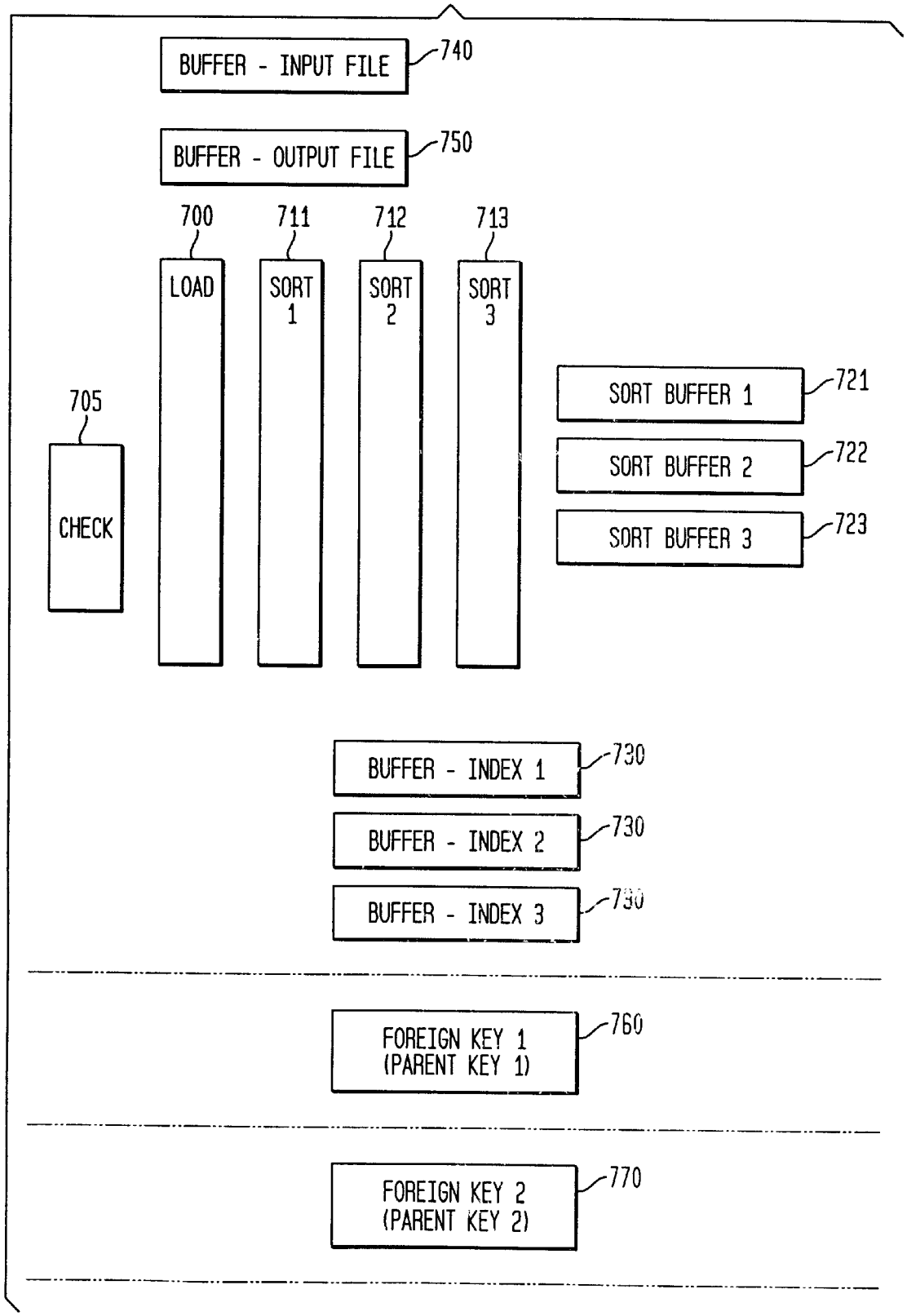
FIG. 7 illustrates an exemplary allocation of dataspace for a LOAD utility according to an embodiment of the present invention.

FIGS. 6 and 7 illustrate the address space utilized by a conventional LOAD utility according to the prior art (FIG. 6) and utilized by an exemplary LOAD utility 150 according to an embodiment of the present invention (FIG. 7). As is known in the art, address space and dataspace refer to virtual storage in an IBM MVS operating system, address space being capable of executing instructions while dataspace is a subset of address space and is limited to storing data only.

As illustrated in FIG. 6, a conventional prior art LOAD utility consumes a significant amount of the available address space in a database management system. A SORT utility, which operates in conjunction with the LOAD utility, also consumes significant address space. FIG. 6 shows address space that is consumed, for example, by LOAD utility code 600 and SORT utility code 610 as well as SORT buffer 620, input file buffer 640, output file buffer 650 and index buffers 630. The input file buffer 640 stores rows that are retrieved from, for example, an input file 160 to be loaded into a table while output file buffer 650 stores rows that are to be written to DASD (e.g., loaded into a table).

Figure 1:
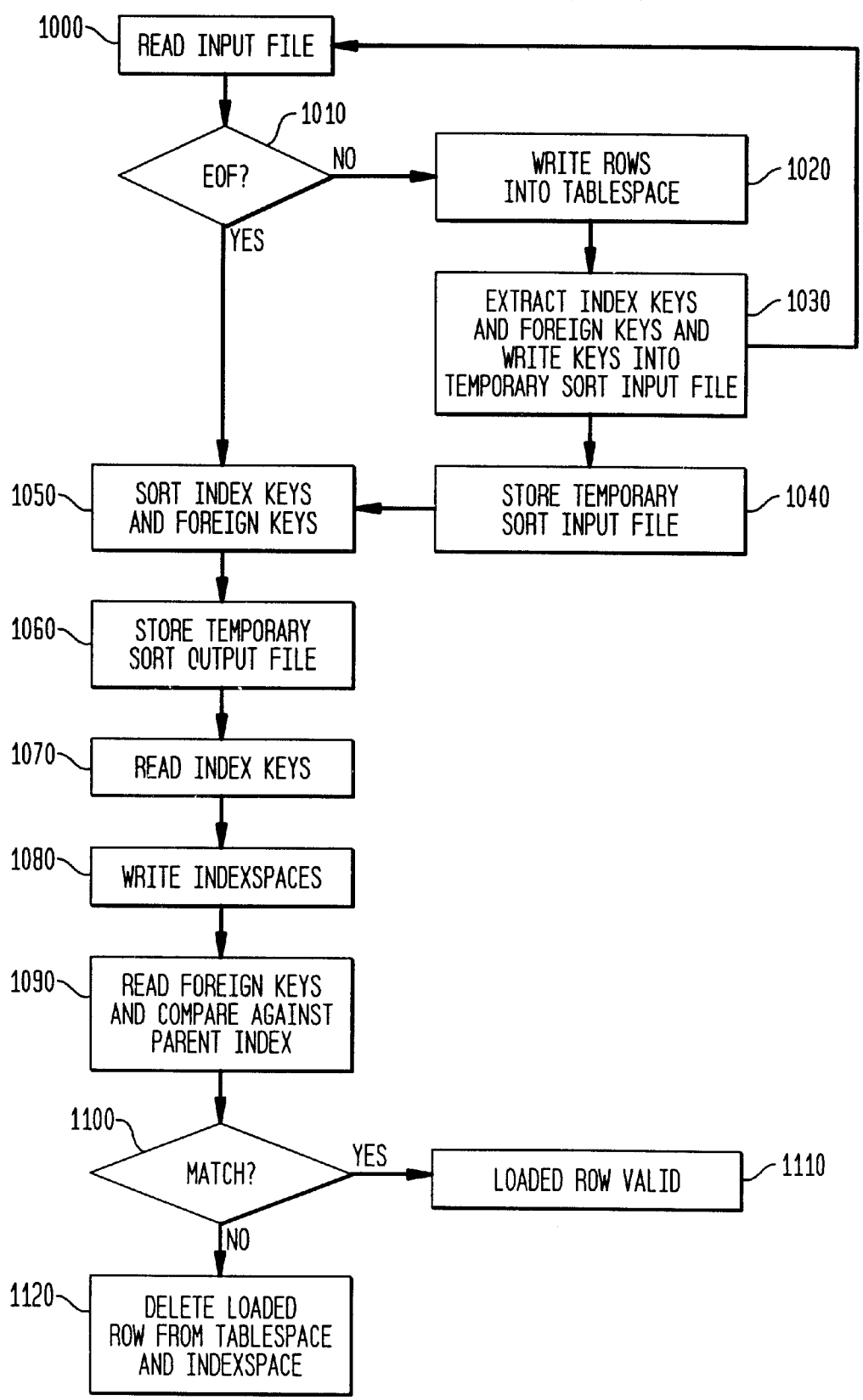
FIG. 1 illustrates a prior art method of loading data into a database and enforcing referential integrity constraints.

Using the previous order_entry table example and the explanation of the prior art LOAD utility provided by FIG. 1, not only is significant address space consumed by the SORT utility code 610, but also SORT buffer 620 consumes significant address space as all of the index keys and foreign keys are temporarily stored in a portion of the SORT buffer 620, then sorted by the SORT utility code 610 to be allocated into the proper sequence and then written to another portion of the SORT buffer 620. In addition, the sorted index keys are extracted from the SORT buffer 620 into the respective index buffers 630 (e.g., there is a buffer index 630 for order_number, buyer name and ship to_zip) so that the indexes can be written to DASD, each of the index buffers 630 consuming address space.

As explained above, the prior art LOAD utility illustrated in FIG. 6 does not enforce constraints prior to loading the data into a table but rather utilizes the foreign keys stored in SORT buffer 620, which are compared with the appropriate parent index in order to enforce referential integrity constraints after data is loaded into the table. Further, in such conventional LOAD utilities, the available address space is substantially utilized and there is insufficient additional address space available for the buffers that would be needed to enforce constraints prior to loading data into a table (e.g., additional buffers sufficient to store the data that would be otherwise obtained by I/Os).

FIG. 7 illustrates an exemplary consumption of address space by a LOAD utility according to an embodiment of the present invention. The LOAD utility according to the present invention overcomes the problem of limited address space available for additional buffers required to store the data needed to perform constraint enforcement prior to loading by utilizing the method described for example, in FIGS. 3A to 5. As shown in FIG. 7, the address space includes LOAD utility code 700 and CHECK subutility code 705 as well as the allocation of additional dataspace, illustrated as dataspaces 760 and 770 (e.g., one additional dataspace for each referential integrity constraint to be enforced). As explained above, the allocation of additional dataspace that is accessible by the CHECK subutility according to an embodiment of the present invention allows for constraint enforcement to be performed prior to loading data into a table.

In contrast to conventional LOAD utilities such as illustrated in FIG. 6, the address space utilized according to an embodiment of the present invention includes the code for three separate SORT utilities 711, 712 and 713 instead of a single SORT utility as is used in conventional LOAD utilities. For example, as the processing speed (e.g., efficiency) for a SORT operation decreases non-linearly with an increase in the number of records to be sorted, providing a separate SORT utility (e.g., a separate SORT utility for each index in the order_entry table) can significantly increase the speed at which the SORT operation can be performed as well as allowing for the three SORT operations to be performed concurrently, thus further improving the performance of the SORT operation. As three SORT utilities are provided, three sort buffers 721, 722 and 723 are also stored in the address space as shown in FIG. 7. The input file buffer 740, output file buffer 750 and index buffer 730 operate similarly to the corresponding buffers shown in FIG. 6. However, unlike the allocation and use of address space in prior art LOAD utilities, the LOAD utility according to an embodiment of the present invention does not need to provide a buffer to temporarily store extracted foreign keys for use in post-loading constraint enforcement as the pre-loading constraint enforcement using a CHECK subutility according to an embodiment of the present invention eliminates the need for temporarily storing foreign keys.

Therefore, using the LOAD and CHECK utilities according to an embodiment of the present invention performs constraint enforcement prior to loading data into a table thereby eliminating writing unchecked and potentially invalid rows into the tablespace, eliminating sorting and writing index keys of unchecked and potentially invalid rows, eliminating the need to read the tablespace during constraint enforcement, eliminating the need to delete invalid rows from the tablespace and eliminating the need to delete invalid rows from the indexspace(s).

What is claimed is:

1. A method for loading data into a database, comprising:
prior to loading the data into the table,
receiving data to be loaded into a table;
identifying a constraint to be applied to the data;
allocating dataspace outside the address space initially allocated by a load function;
storing a value of the constraint;
comparing the value of the constraint and a value of the data; and
determining whether to load the data into the table as a function of the comparison.

2. A method for loading a record into a database, comprising:
initializing a load function;
initializing a check function;
reading a record in an input file;
allocating dataspace outside the address space initially allocated by a load function;
determining, prior to loading the record, if a constraint violation exists for the record via the check function; and
if no constraint violation exists, loading the record into the database via the load function and passing an index key for the record to a sort function.

3. The method according to claim 2, further comprising the step of, if a constraint violation exists, discarding the record.

4. The method according to claim 2, further comprising the step of determining if an end of file condition exists for the input file.

5. The method according to claim 4, further comprising the steps of, if an end of file condition exists, sorting the index key for each record of the input file and writing each index key to an indexspace.

6. The method according to claim 2, wherein the step of initializing the check function includes determining if at least one of a check constraint and a referential integrity constraint are defined for the input file.

7. The method according to claim 6, further comprising the steps of:
if the check constraint is defined for the input file, compiling a check constraint routine as a function of the check constraint; and
if the referential integrity constraint is defined for the input file, identifying a parent index for the referential integrity constraint.

8. The method according to claim 7, further comprising the steps of, when the referential integrity constraint is defined:
allocating a dataspace for the referential integrity constraint; and
attaching a reader subtask to the parent index to identify the parent key values to be stored in the allocated dataspace.

9. The method according to claim 8, wherein the step of allocating the dataspace includes allocating dataspace in addition to address space utilized by the load function.

10. The method according to claim 8, wherein the step of allocating the dataspace is performed via a service of an operating system of a computer system including a database management system.

11. The method according to claim 10, wherein the service includes an IBM MVS service, the allocated dataspace providing supplemental memory for constraint enforcement by the check function prior to loading the record into the database, a size of the allocated dataspace being determined as a function of a relative byte address of the parent index.

12. The method according to claim 6, wherein the step of determining at least one of the check constraint and the referential integrity constraint are defined for the input file is performed via reading a catalog of a database system, the database system including the database to be loaded.

13. The method according to claim 12, wherein the catalog includes a DB2 catalog of a DB2 database management system.

14. The method according to claim 2, wherein the step of reading the record includes reading the record from the input file and providing an address of the record to the check function.

15. The method according to claim 14, wherein the step of determining if the constraint violation exists includes:
determining if a check constraint is defined for the input file;
if a check constraint is defined, executing a compiled check constraint routine on the record;
determining if a referential integrity constraint is defined for the input file; and
if a referential integrity constraint is defined,
locating a foreign key for the record, and
performing, using a dataspace allocated in addition to address space utilized by the load function, a compare operation using the foreign key to determine one of a pass condition and a fail condition for the record.

16. A memory for storing data for access by an application program being executed on a data processing system for loading a record of an input file into a database, comprising:
a load function stored in the memory;
a check function stored in the memory;
a sort function stored in the memory; and
a dataspace allocated in the memory for constraint enforcement, the dataspace being outside the address space initially allocated by the load function;
wherein, utilizing the dataspace, the check function performs constraint enforcement, prior to loading, to determine if the record of the input file violates a constraint, and if no constraint violation exists, the load function loads the record into the database and passes an index key for the record to the sort function.

17. The memory according to claim 16, wherein the memory includes virtual storage in an IBM MVS operating system.

18. The memory according to claim 16, wherein the sort function includes a plurality of sort functions and an associated buffer for each of the plurality of sort functions, the plurality of sort functions allowing concurrent processing of records of the input file to write the index key for each record into an indexspace of the memory.

19. The memory according to claim 16, wherein the allocated dataspace includes a plurality of dataspaces, each of the plurality of dataspaces being associated with a predetermined referential integrity constraint.

20. The memory according to claim 16, wherein the load function includes the check function.

21. A method for loading a record into a database, comprising:

prior to loading a record into a database,
  identifying a parent index for integrity constraint check;
  determining a size of the parent index;
  allocating a dataspace in memory to temporarily store one or more parent key values associated with the parent index, the dataspace being outside the address space initially allocated;
  storing the one or more parent key values in the dataspace;
  reading a record to load;
  if referential integrity check is defined,
    extracting a foreign key value in the record; and
    comparing the foreign key value against the parent key value in the dataspace;
  if the foreign key value corresponds to the parent key value,
    loading the record into a tablespace;
    building a key for a tablespace index; and
  if the foreign key value does not correspond to the parent key value,
    discarding the record.

* * * * *